United States Patent
Kim et al.

(10) Patent No.: US 8,941,973 B2
(45) Date of Patent: Jan. 27, 2015

(54) MULTILAYER CERAMIC ELECTRONIC COMPONENT AND METHOD OF MANUFACTURING THE SAME

(75) Inventors: Jong Han Kim, Gyunggi-do (KR); Jae Man Park, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 147 days.

(21) Appl. No.: 13/620,559

(22) Filed: Sep. 14, 2012

(65) Prior Publication Data

US 2013/0286538 A1    Oct. 31, 2013

(30) Foreign Application Priority Data

Apr. 26, 2012    (KR) .................. 10-2012-0043979

(51) Int. Cl.
  *H01G 4/005*    (2006.01)
  *H01G 7/00*    (2006.01)

(52) U.S. Cl.
  USPC ........ 361/303; 361/301.4; 361/305; 29/25.41

(58) Field of Classification Search
  CPC ....... H01G 4/30; H01G 4/0085; H01G 4/012; H01G 4/005; H01G 4/01
  USPC ................. 361/301.4, 303, 305; 29/25.41
  See application file for complete search history.

(56) References Cited

U.S. PATENT DOCUMENTS

| | | | | |
|---|---|---|---|---|
| 2006/0221547 A1* | 10/2006 | Miura et al. | .................. | 361/305 |
| 2009/0122462 A1* | 5/2009 | Suzuki et al. | .............. | 361/321.2 |
| 2012/0162854 A1* | 6/2012 | Iwanaga | ...................... | 361/301.4 |

FOREIGN PATENT DOCUMENTS

| | | |
|---|---|---|
| JP | 2002-343669 A | 11/2002 |
| KR | 2007-0015445 A | 2/2007 |

* cited by examiner

*Primary Examiner* — Dion R Ferguson
(74) *Attorney, Agent, or Firm* — McDermott Will & Emery LLP

(57) ABSTRACT

There are provided a multilayer ceramic electronic component and a manufacturing method thereof, the multilayer ceramic electronic component including: a ceramic body including dielectric layers; a plurality of internal electrodes facing each other with the dielectric layer interposed therebetween; and external electrodes electrically connected to the internal electrodes, wherein a thickness to of the internal electrode satisfies 0.1 μm≤Te≤0.5 μm, and when, in a cross-section of the ceramic body taken in length and thickness directions, cut through a central portion of the ceramic body in a width direction, a distance, in the length direction, of a central portion of an internal electrode grain closest to a disconnected portion of the internal electrode is denoted by Tc, and a distance, in the length direction, of the internal electrode grain at a point equal to 25% of the thickness thereof above or below the central portion thereof is denoted by Tl, 0.7≤Tl/Tc≤1.3 is satisfied.

20 Claims, 3 Drawing Sheets

A

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0043979 filed on Apr. 26, 2012, in the Korean Intellectual Property Office, the disclosure of which is incorporated herein by reference.

BACKGROUND OF THE INVENTION

1. Field of the Invention

The present invention relates to a large-capacitance multilayer ceramic electronic component having improved withstand voltage characteristics and excellent reliability.

2. Description of the Related Art

In accordance with the recent trend for the miniaturization of electronic devices, multilayer ceramic electronic components have also been required to be small and have high capacitance.

Therefore, various methods to allow dielectric layers and internal electrodes to be thinned and multilayered have been attempted. Recently, as the thickness of dielectric layers has been reduced, multilayer ceramic electronic components having an increased number of laminations have been manufactured.

As the thicknesses of dielectric layers and the internal electrodes have been decreased in order to realize a large capacity, the thickness of individual internal electrodes may be neither uniform nor continuous, and thus, internal electrodes may be partially disconnected, resulting in a degradation in component performance.

As described above, in the case in which the internal electrode is partially disconnected, the disconnected electrode portion may have a pointed tip or be protruded into an adjacent dielectric layer, and thus, an electrical field may be focused on the pointed tip portion or the non-uniformly protruded portion of the disconnected region, resulting in a deterioration of breakdown voltage (BDV) characteristics.

The above defects may cause a deterioration of insulation properties, and thus, deteriorate reliability of the multilayer ceramic electronic component.

RELATED ART DOCUMENTS (Patent Document 1) Japanese Patent Laid-Open Publication No. 2002-343669
(Patent Document 2) Korean Patent Laid-Open Publication No. 2007-0015445

SUMMARY OF THE INVENTION

An aspect of the present invention provides a large-capacitance multilayer ceramic electronic component having improved withstand voltage characteristics and excellent reliability.

According to an aspect of the present invention, there is provided a multilayer ceramic electronic component, including: a ceramic body including dielectric layers therein; a plurality of internal electrodes facing each other with the dielectric layer interposed therebetween; and external electrodes electrically connected to the plurality of internal electrodes, wherein, when a thickness of the internal electrode is denoted by te, $0.1\ \mu m \leq Te \leq 0.5\ \mu m$ is satisfied, and when, in a cross-section of the ceramic body taken in length and thickness (L-T) directions, cut through a central portion of the ceramic body in a width (W) direction thereof, a distance, in the length direction, of a central portion of an internal electrode grain closest to a disconnected portion of the internal electrode is denoted by Tc, and a distance, in the length direction, of the internal electrode grain at a point equal to 25% of the thickness thereof above or below the central portion thereof is denoted by Tl, $0.7 \leq Tl/Tc \leq 1.3$ is satisfied.

The thickness te of the internal electrode may be an average thickness of the internal electrode.

When an average thickness of the dielectric layer is denoted by td, $td \leq 0.6\ \mu m$ may be satisfied.

The internal electrode may contain a conductive metal powder and a ceramic powder, and when an average grain diameter of the conductive metal powder is denoted by Dn and an average grain diameter of the ceramic powder is denoted by Ds, $Ds/Dn \leq 1/6$ may be satisfied.

The ceramic powder contained in the internal electrode may include barium titanate ($BaTiO_3$).

In the cross-section of the ceramic body taken in the length and thickness (L-T) directions, cut through the central portion of the ceramic body in the width (W) direction thereof, the number of dielectric grains per dielectric layer in the thickness direction may be 2 to 7.

According to another aspect of the present invention, there is provided a multilayer ceramic electronic component, including: a ceramic body including dielectric layers therein; a plurality of internal electrodes facing each other with the dielectric layer interposed therebetween; and external electrodes electrically connected to the plurality of internal electrodes, wherein, when a thickness of the dielectric layer is denoted by td, $td \leq 0.6\ \mu M$ is satisfied, and when, in a cross-section of the ceramic body taken in length and thickness (L-T) directions, cut through a central portion of the ceramic body in a width (W) direction thereof, a distance, in the length direction, of a central portion of an internal electrode grain closest to a disconnected portion of the internal electrode is denoted by Tc, and a distance, in the length direction, of the internal electrode grain at a point equal to 25% of a thickness thereof above or below the central portion thereof is denoted by Tl, $0.7 \leq Tl/Tc \leq 1.3$ is satisfied.

When the thickness of the internal electrode is denoted by te, $0.1\ \mu m \leq Te \leq 0.5\ \mu m$ may be satisfied.

The thickness te of the internal electrode may be an average thickness of the internal electrode.

The thickness td of the dielectric layer may be an average thickness of the dielectric layer.

The internal electrode may contain a conductive metal powder and a ceramic powder, and when an average grain diameter of the conductive metal powder is denoted by Dn and an average grain diameter of the ceramic powder is denoted by Ds, $Ds/Dn \leq 1/6$ may be satisfied.

In the cross-section of the ceramic body taken in the length and thickness (L-T) directions, cut through the central portion of the ceramic body in the width (W) direction thereof, the number of dielectric grains per dielectric layer in the thickness direction may be 2 to 7.

According to another aspect of the present invention, there is provided a method of manufacturing a multilayer ceramic electronic component, the method including: preparing ceramic green sheets including dielectric layers; forming internal electrode patterns on the ceramic green sheets, by using a conductive paste for internal electrodes, containing a conductive metal powder and a ceramic powder; and laminating and sintering the ceramic green sheets having the internal electrode patterns formed thereon, to thereby form a ceramic body including a plurality of internal electrodes disposed to face each other with the dielectric layer interposed therebetween, wherein, in a cross-section of the ceramic body taken in length and thickness (L-T) directions, cut through a central portion of the ceramic body in a width (W) direction thereof, a distance, in the length direction, of a central portion of an internal electrode grain closest to a disconnected portion of the internal electrode is denoted by Tc, and a distance, in the length direction, of the internal electrode grain at a point equal to 25% of a thickness thereof above or below the central portion thereof is denoted by Tl, $0.7 \leq Tl/Tc \leq 1.3$ is satisfied.

When an average grain diameter of the conductive metal powder is denoted by Dn and an average grain diameter of the ceramic powder is denoted by Ds, $Ds/Dn \leq 1/6$ may be satisfied.

When the thickness of the internal electrode is denoted by te, $0.1 \mu m \leq Te \leq 0.5 \mu m$ may be satisfied.

The thickness te of the internal electrode may be an average thickness of the internal electrode.

When a thickness of the dielectric layer is denoted by td, $td \leq 0.6 \mu m$ may be satisfied.

The thickness td of the dielectric layer may be an average thickness of the dielectric layer.

In the cross-section of the ceramic body taken in the length and thickness (L-T) directions, cut through the central portion of the ceramic body in the width (W) direction thereof, the number of dielectric grains per dielectric layer in the thickness direction may be 2 to 7.

The ceramic powder contained in the conductive paste for internal electrodes may include barium titanate ($BaTiO_3$).

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE EMBODIMENTS

Figure 1:
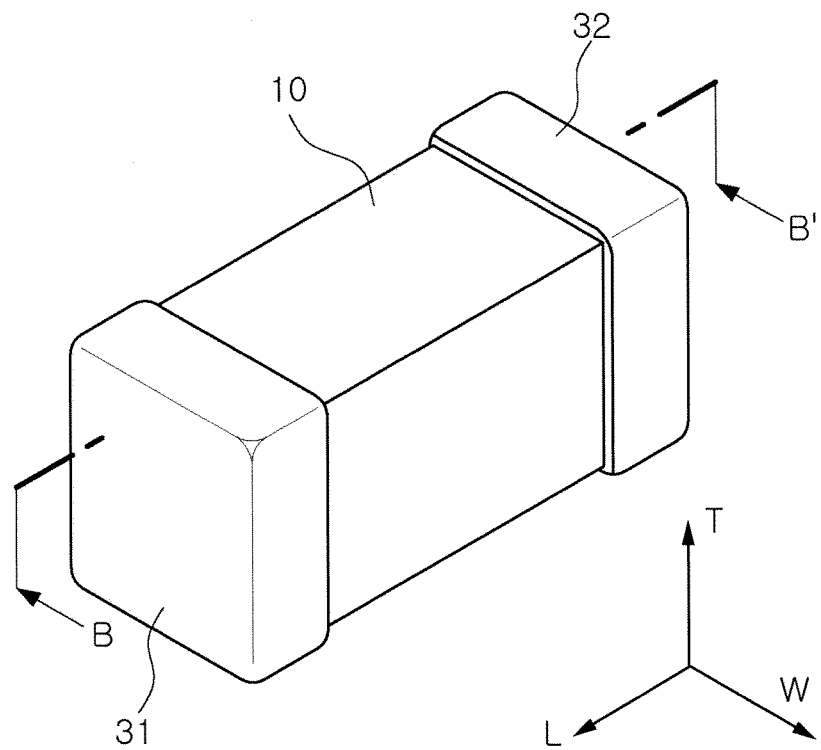
FIG. 1 is a perspective view schematically illustrating a multilayer ceramic capacitor according to an embodiment of the present invention.

The embodiments of the present invention may be modified in many different forms and the scope of the invention should not be limited to the embodiments set forth herein. The embodiments of the present invention are provided so that those skilled in the art may more completely understand the present invention. In the drawings, the shapes and dimensions of elements may be exaggerated for clarity, and the same reference numerals will be used throughout to designate the same or like elements.

Embodiments of the present invention will now be described in detail with reference to the accompanying drawings.

FIG. 1 is a perspective view schematically illustrating a multilayer ceramic capacitor according to an embodiment of the present invention.

Figure 2:
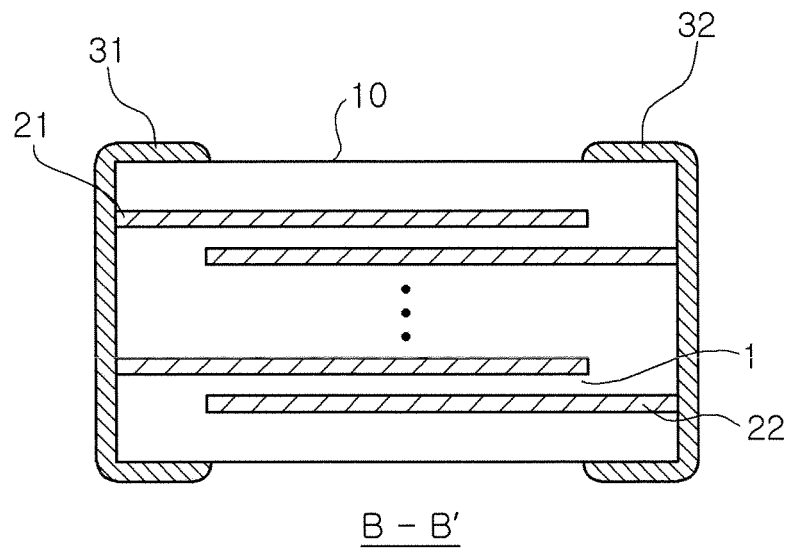
FIG. 2 is a cross-sectional view taken along line B-B' of FIG. 1.

FIG. 2 is a cross-sectional view taken along line B-B' of FIG. 1.

Figure 3:
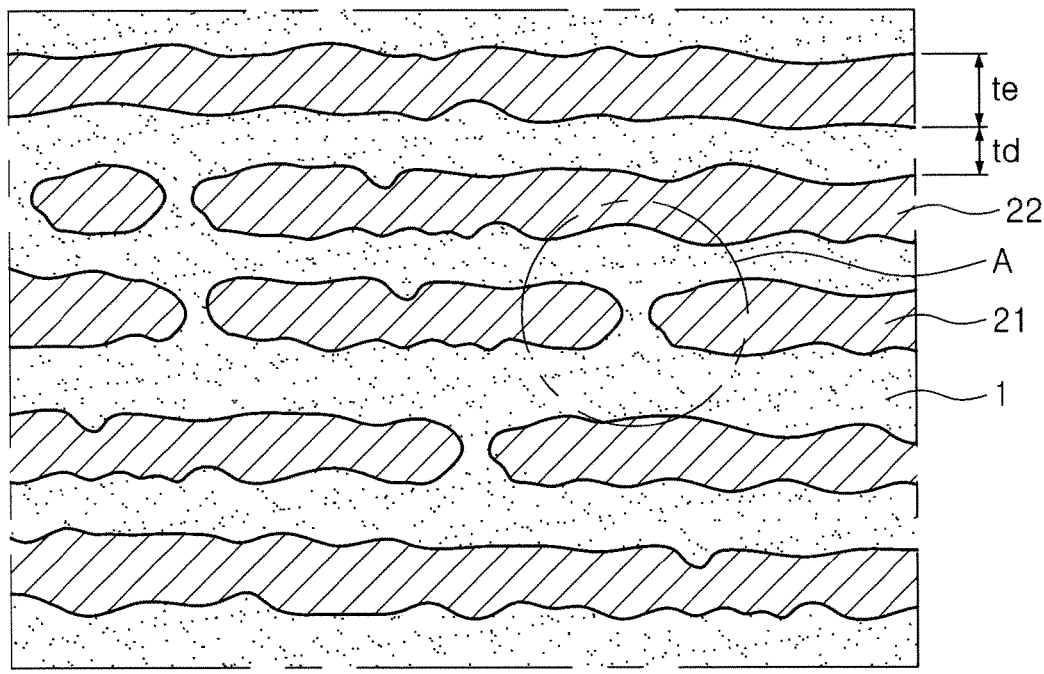
FIG. 3 is a partially enlarged view schematically illustrating a cross-section of a multilayer ceramic capacitor according to an embodiment of the present invention.

FIG. 3 is a partially enlarged view schematically illustrating a cross-section of a multilayer ceramic capacitor according to an embodiment of the present invention.

Figure 4:
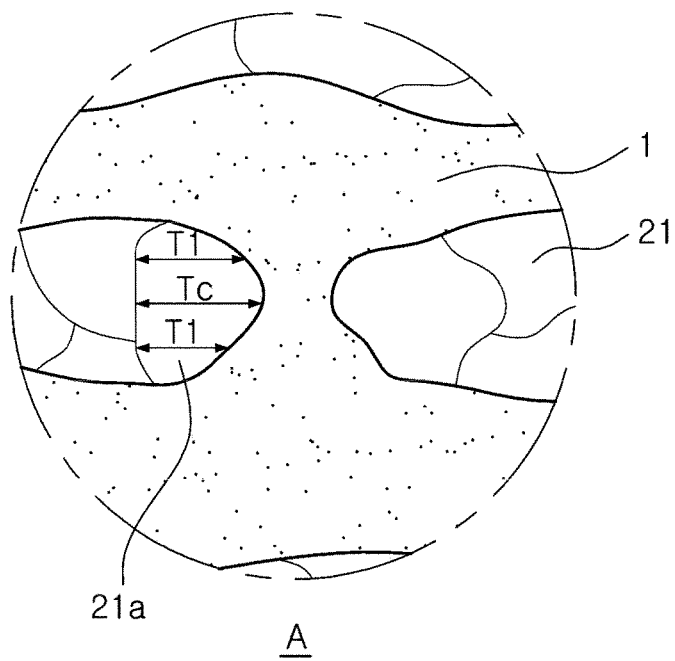
FIG. 4 is an enlarged view schematically illustrating Region A of FIG. 3.

FIG. 4 is an enlarged view schematically illustrating Region A of FIG. 3.

Referring to FIGS. 1 to 4, a multilayer ceramic electronic component according to an embodiment of the present invention may include: a ceramic body 10 including dielectric layers 1; a plurality of internal electrodes 21 and 22 facing each other with the dielectric layer 1 interposed therebetween in the ceramic body 10; and external electrodes 31 and 32 electrically connected to the plurality of internal electrodes 21 and 22. Here, in a cross-section of the ceramic body 10 taken in length and thickness (L-T) directions, cut through a central portion of the ceramic body 10 in a width (W) direction thereof, when a distance, in a length direction, of a central portion of an internal electrode grain 21a closest to a disconnected portion of the internal electrode is denoted by Tc, and a distance, in the length direction, of the internal electrode grain 21a at a point equal to 25% of the thickness thereof above or below the central portion thereof is denoted by Tl, $0.7 \leq Tl/Tc \leq 1.3$ may be satisfied.

Here, a thickness of the internal electrode is denoted by te, $0.1 \mu m \leq Te \leq 0.5 \mu m$ may be satisfied. The thickness to of the internal electrode may be an average thickness of the plurality of internal electrodes 21 and 22.

Hereinafter, a multilayer ceramic electronic component according to an embodiment of the present invention, particularly, a multilayer ceramic capacitor, will be described, but the present invention is not limited thereto.

In a multilayer ceramic capacitor according to an embodiment of the present invention, "length direction", "width direction", and "thickness direction" will be respectively defined as the 'L' direction, the 'W' direction, and the 'T' direction, depicted in FIG. 1. Here, the term 'thickness direction' may be used to refer to a direction in which dielectric layers are laminated, that is, a 'lamination direction'.

According to an embodiment of the present invention, a raw material for forming the dielectric layer 1 is not particularly limited as long as a sufficient amount of capacitance can be obtained therewith. For example, barium titanate ($BaTiO_3$) powder may be used therefor.

As a material for forming the dielectric layer 1, various ceramic additives, organic solvents, plasticizers, binders, dispersants, or the like may be added to powder such as the barium titanate ($BaTiO_3$) powder or the like, depending on the purpose of the present invention.

An average grain diameter of the ceramic powder used in the forming of the dielectric layer 1 is not particularly limited, and may be controlled in order to achieve objects of the present invention, and for example, may be controlled to 400 nm or less.

A material for forming the plurality of first and second internal electrodes 21 and 22 is not particularly limited, but may be, for example, a conductive paste including at least one of silver (Ag), lead (Pb), platinum (Pt), nickel (Ni), and copper (Cu).

In addition, the plurality of internal electrodes 21 and 22 may include a ceramic, and the ceramic is not particularly limited, but may be, for example, barium titanate ($BaTiO_3$).

The external electrodes 31 and 32 may be formed on external surfaces of the ceramic body 10 in order to form capacitance, and may be electrically connected to the plurality of first and second inner electrodes 21 and 22.

The external electrodes 31 and 32 may be formed of the same conductive material as that of the internal electrodes, but are not limited thereto. For example, the external electrodes 31 and 32 may be formed of copper (Cu), silver (Ag), nickel (Ni), or the like.

The external electrodes 31 and 32 may be formed by coating a conductive paste prepared by adding glass frit to the metal powder and then performing sintering.

Referring to FIGS. 2 and 3, when the thickness of the internal electrode 21 or 22 is denoted by te, $0.1\ \mu m \leq Te \leq 0.5\ \mu m$ may be satisfied. The thickness te of the internal electrode 21 or 22 may be an average thickness of the plurality of internal electrodes 21 and 22.

In an embodiment of the present invention, the average thickness of the plurality of internal electrodes 21 and 22 may be measured from an image obtained by scanning a cross-section of the ceramic body 10 in a length direction thereof using a scanning electron microscope (SEM), as shown in FIG. 2.

For example, as shown in FIG. 2, the average thickness of the plurality of internal electrodes 21 and 22 may be obtained by measuring the thicknesses thereof at 30 equidistant points in the length direction, on an image of any internal electrode extracted from the image obtained by scanning a cross-section in the length-thickness (L-T) direction, cut through a central portion of the ceramic body 10 in the width (W) direction thereof, using a scanning electron microscope (SEM), and then averaging the measured thicknesses. The thickness to of the internal electrode may be defined as the average thickness of the plurality of internal electrodes calculated as above.

The thicknesses at 30 equidistant points may be measured in a capacitance forming part that refers to an area in which the first and second internal electrodes 21 and 22 overlap each other.

In addition, when this method for average value measurement is extensively performed on ten or more internal electrodes and an average thereof is calculated, the average thickness of the plurality of internal electrodes 21 and 22 may further be generalized.

Generally, as the thickness of the internal electrode is decreased, the thickness of the internal electrode is not uniform and the internal electrode is not continuous, and thus, the inner electrode may be partially disconnected, resulting in a deterioration in performance.

In the case in which the internal electrode is partially disconnected, the shape of a disconnected portion may have a pointed tip or be protruded into an adjacent dielectric layer, and thus, an electrical field may be focused on the pointed tip portion or the non-uniformly protruded portion of the disconnected portion. Therefore, short circuits may occur and breakdown voltage (BDV) characteristics may be deteriorated.

In particular, in the case in which the average thickness te of the plurality of internal electrodes 21 and 22 is $0.1\ \mu m \leq Te \leq 0.5\ \mu m$, short circuits and a deterioration in breakdown voltage (BDV) characteristics may frequently occur.

However, as will later be described, according to an embodiment of the present invention, even in the case that the average thickness te of the plurality of internal electrodes 21 and 22 is $0.1\ \mu m \leq Te \leq 0.5\ \mu m$, a large-capacitance multilayer ceramic electronic component having improved withstand voltage characteristics and excellent reliability can be realized by improving the shape of the disconnected portion of the internal electrode.

In the case in which the average thickness te of the plurality of internal electrodes 21 and 22 is below $0.1\ \mu m$, short circuits may occur and breakdown voltage (BDV) characteristics may be deteriorated.

On the other hand, in the case in which the average thickness te of the plurality of internal electrodes 21 and 22 is above $0.5\ \mu m$, the average thickness te of the plurality of internal electrodes 21 and 22 is thick, and thus, short circuits may not occur and breakdown voltage (BDV) characteristics may not be deteriorated.

Referring to FIG. 4, in the cross-section of the ceramic body 10 taken in the length and thickness (L-T) directions, cut through the central portion in the width (W) direction of the ceramic body 10, the distance, in the length direction, of the central portion of the internal electrode grain 21a closest to the disconnected portion of the internal electrode is denoted by Tc, and the distance, in the length direction, of the internal electrode grain 21a closest to the disconnected portion of the internal electrode at a point equal to 25% of the thickness thereof above or below the central portion thereof is denoted by Tl, $0.7 \leq Tl/Tc \leq 1.3$ may be satisfied.

The distance (Tc), in the length direction, of the central portion of the internal electrode grain 21a closest to the disconnected portion of the internal electrode and the distance (Tl), in the length direction, of the internal electrode grain 21a closest to the disconnected portion of the internal electrode at the point equal to 25% of the thickness thereof above or below the central portion thereof may be measured from the image obtained by scanning the cross-section cut through the length direction of the ceramic body 10 using a scanning electron microscope (SEM), as shown in FIG. 2.

For example, as shown in FIG. 2, the distances in the length direction for the respective portions of the internal electrode grain closest to the disconnected portion of the internal electrode may be measured on an image of any internal electrode extracted from the image obtained by scanning the cross-section of the ceramic body 10 taken in the length-thickness (L-T) direction, cut through the central portion of the ceramic body 10 in the width (W) direction, using a scanning electron microscope (SEM).

The disconnected portion of the internal electrode may refer to a portion of an internal electrode that is discontinuous in a cross-section taken in the length direction of each internal electrode. Therefore, final disconnected portions at ends of an internal electrode in an internal electrode printed region are not included in the above-described disconnected portion of the internal electrode.

Specifically, the internal electrode grain 21a closest to the disconnected portion of the internal electrode may refer to an internal electrode grain constituting the disconnected portion of the internal electrode.

In addition, the distance Tc, in the length direction, of the central portion of the internal electrode grain 21a may refer to a distance, in the length direction, of the internal electrode grain 21a at any point of the central portion thereof in the thickness direction of the internal eledtrode.

In addition, the distance Tc, in the length direction, of the central portion of the internal electrode grain 21a closest to the disconnected portion of the internal electrode may refer to a distance from one side of the internal electrode grain 21a to the other side of the internal electrode grain 21a at any point in the central portion thereof.

Meanwhile, a point equal to 25% of the thickness of the internal electrode grain 21a above or below the central portion thereof may refer to a point equal to 25% of the thickness of the internal electrode grain 21a above or below the central portion thereof when a virtual vertical line at any point of the central portion of the internal electrode grain 21a is drawn in the thickness direction of the internal electrode.

In addition, the distance Tl, in the length direction, of the internal electrode grain 21a at the point equal to 25% of the thickness thereof above or below the central portion thereof may refer to a distance from one side of the internal electrode grain 21a to the other side of the internal electrode grain 21a at the point equal to 25% above or below the central portion thereof.

According to an embodiment of the present invention, a ratio between the distance Tc, in the length direction, of the central portion of the internal electrode grain 21a closest to the disconnected portion of the internal electrode and the distance Tl, in the length direction, of the internal electrode grain 21a closest to the disconnected portion of the internal electrode at the point equal to 25% of the thickness thereof above or below the central portion thereof may satisfy $0.7 \leq Tl/Tc \leq 1.3$.

As such, when the ratio between Tc and Tl satisfies $0.7 \leq Tl/Tc \leq 1.3$, the disconnected portion of the internal electrode may be rounded, so that electric field focusing due to the shape of the disconnected portion of the internal electrode may be reduced.

Hence, a high-capacitance multilayer ceramic electronic component having improved withstand voltage characteristics and excellent reliability can be realized.

When the ratio between Tc and Tl (Tl/Tc) is lower than 0.7 or higher than 1.3, the disconnected portion of the internal electrode may have a pointed tip, and as a result, short circuits may occur and withstand voltage characteristics may be deteriorated, due to electric field focusing.

According to an embodiment of the present invention, in order to control the ratio between Tc and Tl to satisfy $0.7 \leq Tl/Tc \leq 1.3$, the internal electrode may contain a conductive metal powder and a ceramic powder, and when an average grain diameter of the conductive metal powder is denoted by Dn and an average grain diameter of the ceramic powder is denoted by Ds, $Ds/Dn \leq 1/6$ may be satisfied.

That is, by controlling the ratio between the average grain diameter Dn of the conductive metal powder and the average grain diameter Ds of the ceramic powder to satisfy $Ds/Dn \leq 1/6$, the disconnected portion of the internal electrode may be rounded.

Specifically, when $Ds/Dn \leq 1/6$ is satisfied, the average grain diameter of the ceramic powder is less than the average grain diameter of the conductive metal powder, and in this case, the disconnected portion of the internal electrode may be rounded due to fine-grain ceramic powder present on a surface of the conductive metal powder.

When the ratio (Ds/Dn) between the average grain diameter Dn of the conductive metal powder and the average grain diameter Ds of the ceramic powder is higher than 1/6, the average grain diameter of the ceramic powder is relatively large, and thus, the disconnected portion of the internal electrode may not be rounded.

This may induce a pointed tip portion or a protrusion to be present at the disconnected portion of the internal electrode, and thus, short circuits may occur and withstand voltage characteristics may be deteriorated, due to electric field focusing.

In addition, when a thickness of the dielectric layer is denoted by td, $td \leq 0.6$ μm may be satisfied. The thickness td of the dielectric layer may refer to an average thickness of the dielectric layer.

In an embodiment of the present invention, the average thickness of the dielectric layer 1 may refer to an average thickness of the dielectric layer 1 disposed between the inner electrodes 21 and 22.

The average thickness of the dielectric layer 1 may be measured from an image obtained by scanning a cross-section of the ceramic body 10 in the length direction using a scanning electron microscope (SEM), as shown in FIG. 2.

For example, as shown in FIG. 2, the average thickness of the dielectric layer 1 may be obtained by measuring thicknesses thereof at 30 equidistant points in the length direction, on an image of any dielectric layer extracted from the image obtained by scanning a cross-section in the length-thickness (L-T) direction, cut through the central portion of the ceramic body 10 in the width (W) direction thereof using a scanning electron microscope (SEM), and then calculating an average value of the measured thicknesses.

The thicknesses at 30 equidistant points may be measured in the capacitance forming part, in which the first and second internal electrodes 21 and 22 overlap each other.

In addition, when this method for average value measurement is extensively performed on ten or more dielectric layers and an average value thereof is calculated, the average thickness of the dielectric layer may be further generalized.

In general, in the case in which the average thickness td of the dielectric layer is low, as shown in $td \leq 0.6$ μm, the internal electrode may be partially disconnected, and thus, the disconnected portion of the internal electrode may have a pointed tip or be protruded into an adjacent dielectric layer. Hence, an electrical field may be focused on the pointed tip portion or the protruded portion of the disconnected portion, and thus, short circuits may occur and withstand voltage characteristics may be deteriorated.

However, according to an embodiment of the present invention, even in the case that the average thickness td of the dielectric layer satisfies $td \leq 0.6$ μm, short circuits may be prevented and withstand voltage characteristics may be improved by allowing the disconnected portion of the internal electrode to be rounded.

On the other hand, in the case in which the average thickness td of the dielectric layer is above 0.6 μm, the average thickness of the dielectric layer is thick, and thus, short circuits may not occur and withstand voltage characteristics may not be deteriorated.

Meanwhile, in the cross-section of the ceramic body taken in the length and thickness (L-T) directions, taken in the central portion of the ceramic body in the width (W) direction, the number of dielectric grains per dielectric layer in the thickness direction may be 2 to 7, but is not limited thereto.

The number of dielectric grains per dielectric layer in the thickness direction may be defined as the number of dielectric grains distributed on a virtual vertical line in the thickness direction from any dielectric layer.

According to an embodiment of the present invention, even in the case of a thin dielectric layer in which the number of dielectric grains per dielectric layer in the thickness direction is 2 to 7, short circuits may be prevented and withstand voltage characteristics may be improved by rounding the disconnected portion of the internal electrode.

The number of dielectric grains per dielectric layer in the thickness direction may refer to the number of dielectric grains, in the thickness direction, per dielectric layer disposed in the central portion of the ceramic body in the cross-section of the ceramic body taken in the length and thickness (L-T) directions, cut through the central portion of the ceramic body in the width (W) direction.

In addition, when this method for average value measurement is extensively performed on ten or more dielectric layers and an average thereof is calculated, the average thickness of the dielectric layer may be further generalized.

When the number of dielectric grains per dielectric layer in the thickness direction is less than 2, due to an excessively small number of dielectric grains, short circuits may occur and withstand voltage characteristics may be deteriorated.

On the other hand, when the number of dielectric grains per dielectric layer in the thickness direction is more than 7, due to an excessively large number of dielectric grains, short circuits may not occur and withstand voltage characteristics may not be deteriorated.

Figure 5:
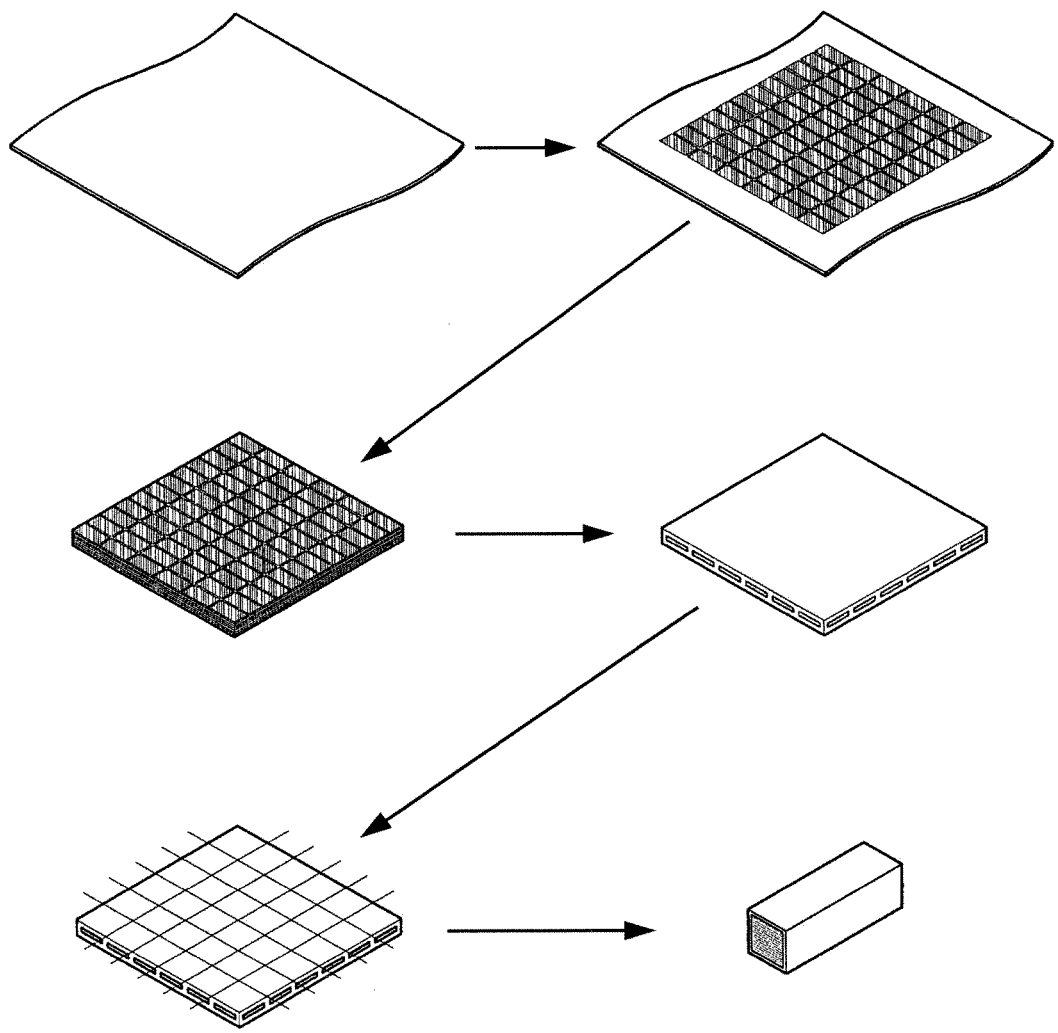
FIG. 5 is a view illustrating a process of manufacturing a multilayer ceramic capacitor according to another embodiment of the present invention.

FIG. 5 is a view illustrating a process of manufacturing a multilayer ceramic capacitor according to another embodiment of the present invention.

Referring to FIG. 5, a method of manufacturing a multilayer ceramic electronic component according to another embodiment of the present invention may include: preparing ceramic green sheets including dielectric layers; forming internal electrode patterns on the ceramic green sheets, respectively, by using a conductive paste for internal electrodes, containing a conductive metal powder and a ceramic powder; and laminating and sintering the ceramic green sheets on which the internal electrode patterns are respectively formed, to thereby form a ceramic body including a plurality of internal electrodes disposed to face each other with the dielectric layer interposed therebetween. Here, in a cross-section of the ceramic body taken in length and thickness (L-T) directions, cut through a central portion of the ceramic body in a width (W) direction thereof, when a distance, in a length direction, of a central portion of an internal electrode grain closest to a disconnected portion of the internal electrode is denoted by Tc, and a distance, in the length direction, of the internal electrode grain at a point equal to 25% of the thickness thereof above or below the central portion thereof is denoted by Tl, $0.7 \leq Tl/Tc \leq 1.3$ may be satisfied.

In the method of manufacturing the multilayer ceramic electronic component according to this embodiment of the present invention, the ceramic green sheets including the dielectric layers may first be prepared.

The ceramic green sheet may be fabricated by mixing a ceramic powder, a binder, and a solvent to prepare a slurry, and molding the slurry into sheets having a thickness of several μm using a doctor blade method.

Then, the internal electrode patterns may be formed on the ceramic green sheets, respectively, by using the conductive paste for internal electrodes, containing the conductive metal powder and the ceramic powder.

Then, the ceramic green sheets on which the internal electrode patterns are respectively formed may be laminated and sintered, to thereby form the ceramic body including the plurality of internal electrodes disposed to face each other with the dielectric layer interposed therebetween.

Here, when an average thickness of the plurality of internal electrodes is denoted by te, $0.1 \mu m \leq Te \leq 0.5 \mu m$ may be satisfied.

In addition, in the cross-section of the ceramic body taken in the length and thickness (L-T) directions, cut through the central portion of the ceramic body in the width (W) direction thereof, when the distance, in the length direction, of the central portion of the internal electrode grain closest to the disconnected portion of the internal electrode is denoted by Tc, and the distance, in the length direction, of the internal electrode grain at the point equal to 25% of the thickness thereof above or below the central portion thereof is denoted by Tl, $0.7 \leq Tl/Tc \leq 1.3$ may be satisfied. Further, when an average thickness of the dielectric layer is denoted by td, $td \leq 0.6$ μm may be satisfied.

The internal electrode may contain the conductive metal powder and the ceramic powder, and when an average grain diameter of the conductive metal powder is denoted by Dn and an average grain diameter of the ceramic powder is denoted by Ds, $Ds/Dn \leq 1/6$ may be satisfied.

In the cross-section taken in the length and thickness (L-T) directions, cut through the central portion of the ceramic body in the width (W) direction, the number of dielectric grains per dielectric layer in the thickness direction may be 2 to 7.

A material for the conductive metal powder may be at least one of silver (Ag), lead (Pb), platinum (Pt), nickel (Ni), and copper (Cu).

In addition, a material for the ceramic powder may be barium titanate ($BaTiO_3$).

Descriptions of the same features as those of the multilayer ceramic electronic component according to the above-described embodiment of the present invention will be omitted.

Hereafter, the present invention will be described in detail with reference to Comparative Examples and Inventive Examples, but is not limited thereto.

These examples were conducted on respective multilayer ceramic capacitors employing the internal electrodes 21 and 22 having an average thickness of $0.1 \mu m \leq Te \leq 0.5 \mu m$, in order to test whether or not withstand voltage characteristics are improved depending on the ratio Ds/Dn between the average grain diameter Dn of the conductive metal powder and the average grain diameter Ds of the ceramic powder and the ratio Tl/Tc between the distance Tc, in the length direction, of the central portion of the internal electrode grain 21a closest to the disconnected portion of the internal electrode and the distance Tl, in the length direction, of the internal electrode grain 21a at the point equal to 25% of the thickness thereof above or below the central portion thereof.

Each multilayer ceramic capacitor according to the examples was manufactured as follows.

First, a slurry including powder made of barium titanate ($BaTiO_3$) or the like having an average grain diameter of 0.1 μm, was coated on a carrier film and dried, to prepare a plurality of ceramic green sheets, and thus, dielectric layers 1 were formed.

Then, a conductive paste for internal electrodes, containing a conductive metal powder and a ceramic powder was prepared.

The conductive paste for internal electrodes was coated on the ceramic green sheets by a screen printing method to form internal electrodes on the ceramic green sheets, respectively, and then the resulting sheets were laminated in an amount of 190 to 250 layers to form a laminate.

Thereafter, the laminate was subjected to compressing and cutting processing, to thereby manufacture 0603 standard-sized chips. The chip was sintered at a temperature of 1050° C. to 1200° C. under a reducing atmosphere of $H_2$ of 0.1% or less.

Next, an external electrode forming process, a plating process, and the like were performed to manufacture a multilayered ceramic capacitor.

As a result of observing a cross-section of each of multilayer ceramic capacitor samples, the average thickness of the internal electrode was around 0.10-0.65 μm and the average thickness of the dielectric layer was 0.10 to 0.8 μm.

Table 1 below compares breakdown voltage (BDV) values depending on the average thickness of the internal electrode, the ratio Ds/Dn between the average grain diameter Dn of the conductive metal powder and the average grain diameter Ds of the ceramic powder, and the ratio Tl/Tc between the distance Tc, in the length direction, of the central portion of the internal electrode grain 21a closest to the disconnected portion of the internal electrode and the distance Tl, in the length direction, of the internal electrode grain 21a at the point equal to 25%, of the thickness thereof above or below the central portion thereof.

TABLE 1

| Sample No. | Average Thickness of Internal Electrode te (μm) | Ds/Dn | Tl/Tc | BDV (Max. 60 V) |
|---|---|---|---|---|
| *1 | 0.102 | 1/4 | 0.65 | X |
| 2 | 0.102 | 1/6 | 0.73 | ○ |
| 3 | 0.105 | 1/12 | 0.95 | ○ |
| *4 | 0.223 | 1/2 | 0.53 | X |
| *5 | 0.225 | 1/4 | 1.33 | X |
| 6 | 0.231 | 1/6 | 1.02 | ○ |
| 7 | 0.220 | 1/12 | 1.11 | ○ |
| *8 | 0.312 | 1/4 | 0.53 | X |
| 9 | 0.322 | 1/6 | 0.77 | ○ |
| 10 | 0.319 | 1/12 | 0.91 | ○ |
| *11 | 0.440 | 1/2 | 0.61 | X |
| *12 | 0.412 | 1/4 | 1.44 | X |
| 13 | 0.426 | 1/6 | 1.28 | ○ |
| 14 | 0.445 | 1/12 | 0.83 | ○ |
| 15 | 0.493 | 1/6 | 0.89 | ○ |
| 16 | 0.488 | 1/12 | 1.15 | ○ |
| *17 | 0.505 | 1/2 | 1.35 | ○ |
| *18 | 0.543 | 1/4 | 0.63 | ○ |
| *19 | 0.524 | 1/6 | 0.84 | ○ |
| *20 | 0.650 | 1/12 | 0.77 | ○ |

In Table 1, the breakdown voltage (BDV) was evaluated by applying DC voltage at a rate of 1.0 V/sec. The multilayer ceramic capacitor was determined as being satisfactory when insulation breakdown did not occur and marked as "O", while being determined as being defective when insulation breakdown occurred and marked as "X", based on a breakdown voltage of 60V.

It can be seen from Table 1 that, in the cases of Samples 2, 3, 6, 7, 9, 10 and 13 to 16 in which the average thickness to of the internal electrode satisfied 0.1 μm≤Te≤0.5 μm, and the ratio (Tl/Tc) between the distance Tc, in the length direction, of the central portion of the internal electrode grain 21a closest to the disconnected portion of the internal electrode and the distance Tl, in the length direction, of the internal electrode grain 21a at the point equal to 25% of the thickness thereof above or below the central portion thereof satisfied 0.7≤Tl/Tc≤1.3, the samples had no insulation breakdown problems.

It can be seen that, in these cases, the ratio Ds/Dn between the average grain diameter Dn of the conductive metal powder and the average grain diameter Ds of the ceramic powder, contained in the conductive paste for internal electrodes, satisfied Ds/Dn≤1/6.

On the other hand, it can be seen that, in the cases of Samples 1, 4, 5, 8, 11, and 12 in which the value of Tl/Tc was less than 0.7 or greater than 1.3, insulation breakdown occurred, which caused withstand voltage characteristics to be deteriorated.

It can be seen that in the cases of Samples 17 to 20 in which the average thickness to of the internal electrode was above 0.5 μm, withstand voltage characteristics were not deteriorated, regardless of whether the ratio Ds/Dn between the average grain diameter Dn of the conductive metal powder and the average grain diameter Ds of the ceramic powder and the ratio Tl/Tc between the distance Tc, in the length direction, of the central portion of the internal electrode grain 21a closest to the disconnected portion of the internal electrode and the distance Tl, in the length direction, of the internal electrode grain 21a at the point equal to 25% of the thickness thereof above or below the central portion thereof satisfied the numerical ranges of the present invention, respectively.

As set forth above, according to embodiments of the present invention, a large-capacitance multilayer ceramic electronic component having improved withstand voltage characteristics and excellent reliability can be realized by rounding the shape of the disconnected portion of the internal electrode.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body including dielectric layers therein;
    a plurality of internal electrodes facing each other with the dielectric layer interposed therebetween; and
    external electrodes electrically connected to the plurality of internal electrodes,
    wherein, when a thickness of the internal electrode is denoted by te, 0.1 μm≤Te≤0.5 μm is satisfied, and
    when, in a cross-section of the ceramic body taken in length and thickness (L-T) directions, cut through a central portion of the ceramic body in a width (W) direction thereof, a distance, in the length direction, of a central portion of an internal electrode grain closest to a disconnected portion of the internal electrode is denoted by Tc, and a distance, in the length direction, of the internal electrode grain at a point equal to 25% of the thickness thereof above or below the central portion thereof is denoted by Tl, 0.7≤Tl/Tc≤1.3 is satisfied.

2. The multilayer ceramic electronic component of claim 1, wherein the thickness te of the internal electrode is an average thickness of the internal electrode.

3. The multilayer ceramic electronic component of claim 1, wherein, when an average thickness of the dielectric layer is denoted by td, td≤0.6 μm is satisfied.

4. The multilayer ceramic electronic component of claim 1, wherein the internal electrode contains a conductive metal powder and a ceramic powder, and
    when an average grain diameter of the conductive metal powder is denoted by Dn and an average grain diameter of the ceramic powder is denoted by Ds, Ds/Dn≤1/6 is satisfied.

5. The multilayer ceramic electronic component of claim 4, wherein the ceramic powder contained in the internal electrode includes barium titanate ($BaTiO_3$).

6. The multilayer ceramic electronic component of claim 1, wherein, in the cross-section of the ceramic body taken in the length and thickness (L-T) directions, cut through the central portion of the ceramic body in the width (W) direction thereof, the number of dielectric grains per dielectric layer in the thickness direction is 2 to 7.

7. A multilayer ceramic electronic component, comprising:
    a ceramic body including dielectric layers therein;
    a plurality of internal electrodes facing each other with the dielectric layer interposed therebetween; and
    external electrodes electrically connected to the plurality of internal electrodes, wherein, when a thickness of the dielectric layer is denoted by td, td≤0.6 μm is satisfied, and when, in a cross-section of the ceramic body taken in length and thickness (L-T) directions, cut through a central portion of the ceramic body in a width (W) direction thereof, a distance, in the length direction, of a central portion of an internal electrode grain closest to a disconnected portion of the internal electrode is denoted by Tc, and a distance, in the length direction, of the internal electrode grain at a point equal to 25% of a thickness thereof above or below the central portion thereof is denoted by Tl, 0.7≤Tl/Tc≤1.3 is satisfied.

8. The multilayer ceramic electronic component of claim 7, wherein, when the thickness of the internal electrode is denoted by te, 0.1 μm≤Te≤0.5 μm is satisfied.

9. The multilayer ceramic electronic component of claim 8, wherein the thickness te of the internal electrode is an average thickness of the internal electrode.

10. The multilayer ceramic electronic component of claim 7, wherein the thickness td of the dielectric layer is an average thickness of the dielectric layer.

11. The multilayer ceramic electronic component of claim 7, wherein the internal electrode contains a conductive metal powder and a ceramic powder, and when an average grain diameter of the conductive metal powder is denoted by Dn and an average grain diameter of the ceramic powder is denoted by Ds, Ds/Dn≤1/6 is satisfied.

12. The multilayer ceramic electronic component of claim 7, wherein, in the cross-section of the ceramic body taken in the length and thickness (L-T) directions, cut through the central portion of the ceramic body in the width (W) direction thereof, the number of dielectric grains per dielectric layer in the thickness direction is 2 to 7.

13. A method of manufacturing a multilayer ceramic electronic component, the method comprising:

preparing ceramic green sheets including dielectric layers;

forming internal electrode patterns on the ceramic green sheets, by using a conductive paste for internal electrodes, containing a conductive metal powder and a ceramic powder; and laminating and sintering the ceramic green sheets having the internal electrode patterns formed thereon, to thereby form a ceramic body including a plurality of internal electrodes disposed to face each other with the dielectric layer interposed therebetween, wherein, in a cross-section of the ceramic body taken in length and thickness (L-T) directions, cut through a central portion of the ceramic body in a width (W) direction thereof, a distance, in the length direction, of a central portion of an internal electrode grain closest to a disconnected portion of the internal electrode is denoted by Tc, and a distance, in the length direction, of the internal electrode grain at a point equal to 25% of a thickness thereof above or below the central portion thereof is denoted by Tl, 0.7≤Tl/Tc≤1.3 is satisfied.

14. The method of claim 13, wherein, when an average grain diameter of the conductive metal powder is denoted by Dn and an average grain diameter of the ceramic powder is denoted by Ds, Ds/Dn≤1/6 is satisfied.

15. The method of claim 13, wherein, when the thickness of the internal electrode is denoted by te, 0.1 μm≤Te≤0.5 μm is satisfied.

16. The method of claim 15, wherein the thickness te of the internal electrode is an average thickness of the internal electrode.

17. The method of claim 13, wherein, when a thickness of the dielectric layer is denoted by td, td≤0.6 μm is satisfied.

18. The method of claim 17, wherein the thickness td of the dielectric layer is an average thickness of the dielectric layer.

19. The method of claim 13, wherein, in the cross-section of the ceramic body taken in the length and thickness (L-T) directions, cut through the central portion of the ceramic body in the width (W) direction thereof, the number of dielectric grains per dielectric layer in the thickness direction is 2 to 7.

20. The method of claim 13, wherein the ceramic powder contained in the conductive paste for internal electrodes includes barium titanate ($BaTiO_3$).

* * * * *

UNITED STATES PATENT AND TRADEMARK OFFICE
CERTIFICATE OF CORRECTION

| | |
|---|---|
| PATENT NO. | : 8,941,973 B2 |
| APPLICATION NO. | : 13/620559 |
| DATED | : January 27, 2015 |
| INVENTOR(S) | : Jong Han Kim et al. |

It is certified that error appears in the above-identified patent and that said Letters Patent is hereby corrected as shown below:

Title page, item (57) Abstract:

Line 7, "internal electrodes, wherein a thickness to of the internal" should read -- internal electrodes, wherein a thickness te of the internal --.

Signed and Sealed this
Ninth Day of June, 2015

Michelle K. Lee
*Director of the United States Patent and Trademark Office*